2,704,775

PREPARATION OF HALOGENATED OLEFINES

Jared W. Clark, Charleston, W. Va., assignor to Union Carbide and Carbon Corporation, a corporation of New York No Drawing. Application February 2, 1951, Serial No. 209,196

6 Claims. (Cl. 260—653)

This improvement relates to halogenated olefines. More particularly it is concerned with an improved process for making chlorotrifluoroethylene from 1,1,2-trichloro-1,2,2-trifluoroethane by removal of chlorine therefrom.

It is known that polychlorofluoroalkanes can be dechlorinated with zinc to yield chlorofluoroalkenes. (Locke et al., J. A. C. S. (1934), vol. 56, 1726). The reaction is a general one which can be applied to the dehalogenation of compounds having one or more chlorine or bromine atoms on each of adjacent carbon atoms. It constitutes, also, a method for preferentially removing chlorine and bromine from compounds of this type in which fluorine is present additionally. The chlorine or bromine atoms are removed in pairs, with one atom of zinc being required to effect the removal of each pair. Thus, the dechlorination of trichlorotrifluoroethane, for instance, by this process results in the production of by-product zinc chloride in an amount which is 1.2 times that of the chlorotrifluoroethylene that is desired. This zinc chloride is finally obtained as an aqueous solution. On a large scale its disposal would constitute a difficult and serious problem since the regeneration of the zinc or the recovery of the contained halogen is not practicable, at least not at the present time. The reaction has the additional disadvantage of being carried out under pressure, in the liquid phase.

It is known also that halogens can be removed from halogenated organic compounds in the presence of hydrogen and this reaction has been applied as a quantitative procedure for the determination of the amount of halogen present. Sabatier and Maihle (Comptes Rendus (1904), vol. 138, 407) have described the reaction of hexachloroethane and hydrogen over a nickel catalyst with the formation of perchloroethylene and hydrogen chloride. As far as is known, however, it was not considered that one halogen could be removed preferentially in the presence of another halogen.

The present improvement is based on my discovery that chlorine can be removed preferentially from 1,1,2-trichloro-1,2,2-trifluoroethane in the presence of hydrogen to form chlorotrifluoroethylene in good yields and efficiencies. Hydrogen chloride is formed along with the main product. The reaction is illustrated by the following equation:

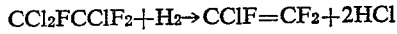

$$CCl_2FCClF_2 + H_2 \rightarrow CClF=CF_2 + 2HCl$$

The reaction can be carried out by passing a mixture of 1,1,2-trichloro-1,2,2-trifluoroethane and hydrogen through a reactor or convertor maintained at an elevated temperature. The reactor can be a length of tube made of nickel or stainless steel, for instance, which can be unfilled, or charged with catalyst as hereinafter described. It can be heated by known expedients, as by immersion in a heated salt bath, for instance, or by an electrical resistance. The vapors issuing from the reactor can be collected by cooling and condensation, after having first been washed to remove the hydrogen chloride, and dried.

For high efficiencies, the reaction is best carried out over nickel, cobalt, copper, platinum, palladium or activated carbon as a catalyst. Of these, nickel is preferred. The catalyst can be in the form of finely divided metal, as for instance Raney nickel, and pressed into pellets, or the catalyst in finely divided form can be deposited on a support. Alternatively, the catalyst can be used in the form of its salts on a support, as for instance nickel chloride on graphite or activated carbon. Similarly, the cobalt, copper, platinum and palladium can be employed in the form of the metal or their salts.

In non-catalytic operations, the reaction can be carried out at temperatures of 450° to 650° C. A temperature of about 450° C. to 575° C. is preferred, however. At temperatures below 450° C. in the absence of a catalyst, the conversion tends to fall off to a low value of about 5 to 10 per cent. At temperatures above 575° C. a shortened reaction time is required to minimize losses by polymer formation and by decomposition to trifluoroethylene and free carbon. The formation of polymer and free carbon results in a deposit on the walls of the reactor which, if allowed to accumulate, would eventually offer excessive resistance to the flow of gas through the reactor and to the transfer of heat through the tube wall. The deposit is hard and adheres firmly to the tube walls but it can readily be removed by burning out with air and with oxygen.

The ratio of hydrogen to 1,1,2-trichloro-1,2,2-trifluoroethane is not narrowly critical. At a ratio of 0.75 mol of hydrogen per mol of 1,1,2-trichloro-1,2,2-trifluoroethane it is possible to react practically all of the hydrogen which facilitates recovery of the chlorotrifluoroethylene and unreacted trichlorotrifluoroethane. Increasing the proportion of hydrogen increases the yield of chlorotrifluoroethylene but the losses to carbon and trifluoroethylene also increase. A ratio of from 0.75 to 3 mols of hydrogen per mol of 1,1,2-trichloro-1,2,2-trifluoroethane is preferred.

Losses to carbon and trifluoroethylene can also be minimized by employing lower temperatures to effect lower single pass yields. Under such conditions, however, any mechanical losses are greatly magnified in terms of decreased efficiencies. Hence, precautions are required also to minimize mechanical losses. In general, the optimum efficiencies are obtained when the single pass yields are in the range of 20 to 40 per cent, based on the 1,1,2-trichloro-1,2,2-trifluoroethane.

The temperatures that are used with catalysts can be lower than those in non-catalytic operations. The actual mechanism of the dechlorination is not known. It may be that the metal functions as a catalyst by reacting to form the metal chloride which then reacts with the hydrogen to give hydrogen chloride, with the free metal being regenerated and the cycle repeated. Temperatures of 400° to 475° C. are preferred. Here, again, higher and lower temperatures can also be used. Appreciable removal of chlorine is effected at temperatures as low as 200° C. with an active catalyst but at this temperature the reduction of metal halides is very slow so that the catalyst in the form of metal tends to be converted to the less active metal chloride and fluoride. At temperatures above 475° C. the catalytic reaction tends to become less efficient due to lessened selectivity in removing chlorine preferentially. The temperature of 475° C. approximates the practicable upper limit for efficient operation. Usable temperatures range up to 525° C., but for these higher temperature ranges a somewhat shorter contact time is recommended.

The following examples are illustrative:

Example 1

A mixture of 739 parts by weight (3.95 mols) of 1,1,2-trichloro-1,2,2-trifluoroethane with hydrogen in a mol ratio of approximately 1 to 3 was passed through an electrically heated tube maintained at a temperature of about 410° to 478° C. The tube which was made of 18–8 stainless steel was three feet long and had an inside diameter of one inch. It was charged with 461 grams (250 milliliters) of Raney nickel catalyst in pellet form. The space velocity was approximately 300 liters per liter of catalyst per hour.

The reaction gases from the tube were passed first through a water scrubber where hydrogen chloride and hydrogen fluoride were removed, and then dried in a calcium chloride drying tower. The product was condensed from the dried gas by means of a series of cold traps cooled by Dry Ice and acetone and a final trap cooled by liquid nitrogen. The excess hydrogen exiting from the nitrogen-cooled trap was vented through a gas meter.

Distillation of the condensate collected in the cold trap yielded 209 parts of a chlorotrifluoroethylene fraction boiling at —30° to —26° C. and having an apparent molecular weight of 118.5 based on vapor density determinations; as compared with the boiling point of —27.9° C. given in literature (Stull, Ind. Eng. Chem., vol. 39, page 518; 1947) and a calculated molecular weight of 116.5. There was obtained also 16 parts of a trifluoroethylene fraction boiling at —55° to —50° C. and having an apparent molecular weight of 88.4 based on vapor density determinations; as compared with the boiling point of —51° C. given in literature (Swarts, Chem. Zentr. II, page 281; 1899), and a calculated molecular weight of 82.0. A third fraction amounting to 45 parts of material boiling above 40° C. was largely unreacted 1,1,2-trichloro-1,2,2-trifluoroethane. The total production of chlorotrifluoroethylene was 240 parts corresponding to a yield of 52.1 per cent. The efficiency was 55.8 per cent. The yield of trifluoroethylene was 5.1 per cent with an efficiency of 5.4 per cent.

*Example 2*

A mixture of 1,1,2-trichloro-1,2,2-trifluoroethane with hydrogen in a mol ratio of about 1 to 1.3 was passed through a reactor maintained at a temperature of about 425° to 480° C. The reactor was a stainless steel tube as in Example 1, charged with 100 milliliters of a catalyst made by evaporating to dryness an aqueous solution of 364 grams of nickel chloride ($NiCl_2 \cdot 6H_2O$) on 300 milliliters (135 grams) of activated carbon pellets of 4 x 6 mesh. The space velocity was 1540 liters per liter of catalyst per hour.

The reaction gases were washed, dried and the reaction product condensed and collected as in Example 1. Upon distillation of the condensate there was obtained 258 parts of a chlorotrifluoroethylene fraction boiling between —30° to —20° C. and 40 parts of a trifluoroethylene fraction boiling below —30° C. The estimated efficiency to chlorotrifluoroethylene based on the trichlorotrifluoroethane was 75 per cent.

*Example 3*

A mixture of 2177 parts by weight of 1,1,2-trichloro-1,2,2-trifluoroethane with hydrogen in a mol ratio of about 1 to 1.4 was passed during a five hour period through a reactor maintained at a temperature of 400° to 500° C. The reactor was a stainless steel tube, as in Example 1, charged with 200 milliliters of a catalyst made by evaporating to dryness an aqueous solution of 140 grams of cobalt chloride ($CoCl_2 \cdot 6H_2O$) on 300 milliliters of activated carbon pellets. The space velocity was 670 liters per liter of catalyst per hour.

The reaction gases were washed, dried and the reaction product condensed and collected as in Example 1. Upon distilling the condensate there was obtained 249 parts of chlorotrifluoroethylene. The yield was 18.5 per cent and the efficiency 63.2 per cent based on the trichlorotrifluoroethane.

*Example 4*

A mixture of 685 parts by weight of 1,1,2-trichloro-1,2,2-trifluoroethane and hydrogen in a mol ratio of 1 to 2.5 was passed through a reactor maintained at a temperature of about 400° to 425° C. during a period of three hours. The reactor was a stainless steel tube as in Example 1. It was charged with 200 milliliters of a catalyst made as follows. A solution of 135 grams of cuprous chloride in 320 grams of hydrochloric acid was evaporated to dryness on 300 milliliters (135 grams) of activated carbon, 4 x 8 mesh in size.

There was obtained 149 parts of chlorotrifluoroethylene for a yield of 35.0 per cent and an efficiency of 60.4 per cent based on the trichlorotrifluoroethane. The production ratio was 249 grams of chlorotrifluoroethylene per liter of catalyst per hour.

*Example 5*

A mixture of 1494 parts by weight of 1,1,2-trichloro-1,2,2-trifluoroethane with hydrogen in a mol ratio of 1 to 0.7 was passed through a reactor which was a nickel tube of one inch, inside diameter, filled with carbon rings. A zone containing 150 milliliters of the carbon rings was maintained at a temperature of 520° to 550° C. and the feed rate adjusted to give a space velocity of about 416 liters, per liter of reactor space per hour.

There was obtained 288 parts of chlorotrifluoroethylene corresponding to a yield of 31 per cent and an efficiency of 66 per cent, based on the trichlorotrifluoroethane. The production ratio was 370 grams of chlorotrifluoroethylene per liter of reactor volume per hour.

*Example 6*

1,1,2-trichloro-1,2,2-trifluoroethane (1651 parts by weight) was fed together with hydrogen in a 1 to 1.4 mol ratio over activated carbon (100 milliliters) contained in a direct-heated stainless steel tube having an inside diameter of one inch. A period of four hours was required, during which the temperature was maintained at about 500° to 520° C.

There was obtained 84 parts of chlorotrifluoroethylene. The unreacted trichlorotrifluoroethane that was recovered amounted to 1540 parts. The yield was 7 per cent and the efficiency based on the trichlorotrifluoroethane was 40 per cent. The production ratio was 211 grams per liter of catalyst per hour.

*Example 7*

1,1,2-trichloro-1,2,2-trifluoroethane (2610 parts by weight) and hydrogen in a mol ratio of 2 to 1, were passed through a reactor over a period of 4.5 hours. The reactor was a nickel tube seven feet long and one inch inside diameter. The top preheater section of the tube, 24 inches in length, was filled with nickel pellets supported on a pad of nickel lathe turnings. The remainder of the tube which was empty except for a nickel thermocouple well was maintained at a temperature of 531° to 534° C. by a heated salt bath. The feed rate was adjusted to give a space velocity of 252 liters per liter of reactor space per hour.

There was obtained 346 parts of chlorotrifluoroethylene and 53 parts of trifluoroethylene. The unreacted trichlorotrifluoroethane that was recovered amounted to 1751 parts. These amounts correspond to an efficiency to chlorotrifluoroethylene of 65 per cent and an efficiency to trifluoroethylene of 14 per cent, based on trichlorotrifluoroethane.

What is claimed is:

1. A process for making chlorotrifluoroethylene which comprises heating a mixture of 1,1,2-trichloro-1,2,2-trifluoroethane and hydrogen in the presence of a nickel catalyst at a temperature of at least 375° C. and not higher than 525° C.

2. A process for making chlorotrifluoroethylene which comprises heating a mixture of 1,1,2-trichloro-1,2,2-trifluoroethane and hydrogen in the presence of a nickel catalyst at a temperature of about 400° to 475° C.

3. A process for making chlorotrifluoroethylene which comprises heating a mixture of 1,1,2-trichloro-1,2,2-trifluoroethane and hydrogen in a ratio of from 0.75 to 3 mols of hydrogen per mol of the 1,1,2-trichloro-1,2,2-trifluoroethane in the presence of a nickel catalyst at a temperature of at least 375° C. and not higher than 525° C.

4. A process for making chlorotrifluoroethylene which comprises heating a mixture of 1,1,2-trichloro-1,2,2-trifluoroethane in a ratio of from 0.75 to 3 mols of hydrogen per mol of 1,1,2-trichloro-1,2,2-trifluoroethane in the presence of a nickel catalyst at a temperature at which hydrogen chloride is formed and below the decomposition temperature of the chlorotrifluoroethylene.

5. In a process for preparing 1,1,2-trifluoro-2-chloroethene, the step which comprises subjecting a mixture of hydrogen and 1,1,2-trifluoro-1,2,2-trichloroethane in the vapor phase to a temperature between about 450° C. and about 525° C. in the presence of a metallic nickel catalyst.

6. In a process for preparing 1,1,2-trifluoro-2-chloroethene, the step which comprises subjecting a mixture of hydrogen and 1,1,2-trifluoro-1,2,2-trichloroethane in the vapor phase to a temperature between about 450° and about 550° C. in contact with metallic nickel.

References Cited in the file of this patent

UNITED STATES PATENTS 2,504,919     Bordner _____ Apr. 18, 1950